UNITED STATES PATENT OFFICE.

EUGEN OSTERMAYER, OF ERFURT, ASSIGNOR TO THE FARBWERKE, VORMALS MEISTER, LUCIUS & BRÜNING, OF HÖCHST-ON-THE-MAIN, GERMANY.

COMPOUND OF ANTIPYRINE AND IODINE.

SPECIFICATION forming part of Letters Patent No. 454,223, dated June 16, 1891.

Application filed January 2, 1891. Serial No. 376,523. (Specimens.)

*To all whom it may concern:*

Be it known that I, EUGEN OSTERMAYER, doctor of philosophy, a citizen of the Empire of Germany, residing at Erfurt, in the Empire of Germany, have invented certain new and useful Improvements in the Manufacture of a Compound of Antipyrine and Iodine; and I do hereby declare the following to be a full, clear, and exact description of the invention, such as will enable others skilled in the art to which it appertains to make and use the same.

My invention relates to the manufacture of a compound formed by the action of iodine upon antipyrine, having the formula $C_{11}H_{11}IN_2O$.

The following examples illustrate the manner in which I carry out the invention: Two parts, by weight, of antipyrine are dissolved in twenty parts, by weight, of water and heated to a boiling temperature. To the solution I add alternately potassium carbonate and iodine in fine powder, in all three parts, by weight, potassium carbonate and 2.8 parts, by weight, of iodine. Care must be taken that there shall never be more than a small excess of potassium carbonate, and while heat is maintained no fresh portion of iodine be added until the preceding portion shall have completely disappeared. The reaction may be illustrated by the following formula:

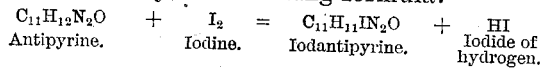

$$C_{11}H_{12}N_2O + I_2 = C_{11}H_{11}IN_2O + HI$$
Antipyrine.  Iodine.  Iodantipyrine.  Iodide of hydrogen.

The crude product separates in the form of a yellowish-brown powder, which is washed with water and recrystallized from diluted alcohol. In a pure state it presents itself in the form of brilliant white prismatic needles, having a melting-point of 158° to 160° centigrade. In water it is nearly insoluble, but readily soluble in hot alcohol.

The compound is to be used as a medicine in doses from eight to twenty-five grains. In fevers it exerts a good influence in reducing the temperature, patients perspiring freely without collapse or subsequent shivering.

For potassium carbonate soda, free alkali, or alkaline earth may be substituted.

What I claim as my invention, and desire to secure by Letters Patent, is—

As a new article for medicinal purposes, a compound of antipyrine and iodine, in the crude state a yellowish-brown powder, in a pure state presenting itself in the form of brilliant white prismatic needles, melting at 158° to 160° centigrade, nearly insoluble in water, and readily soluble in hot alcohol, having the formula $C_{11}H_{11}IN_2O$.

In testimony whereof I affix my signature in presence of two witnesses.

EUGEN OSTERMAYER.

Witnesses:
EMANUEL WITTULA,
CARL BORNGRAEBER.